United States Patent Office 2,968,315
Patented Jan. 17, 1961

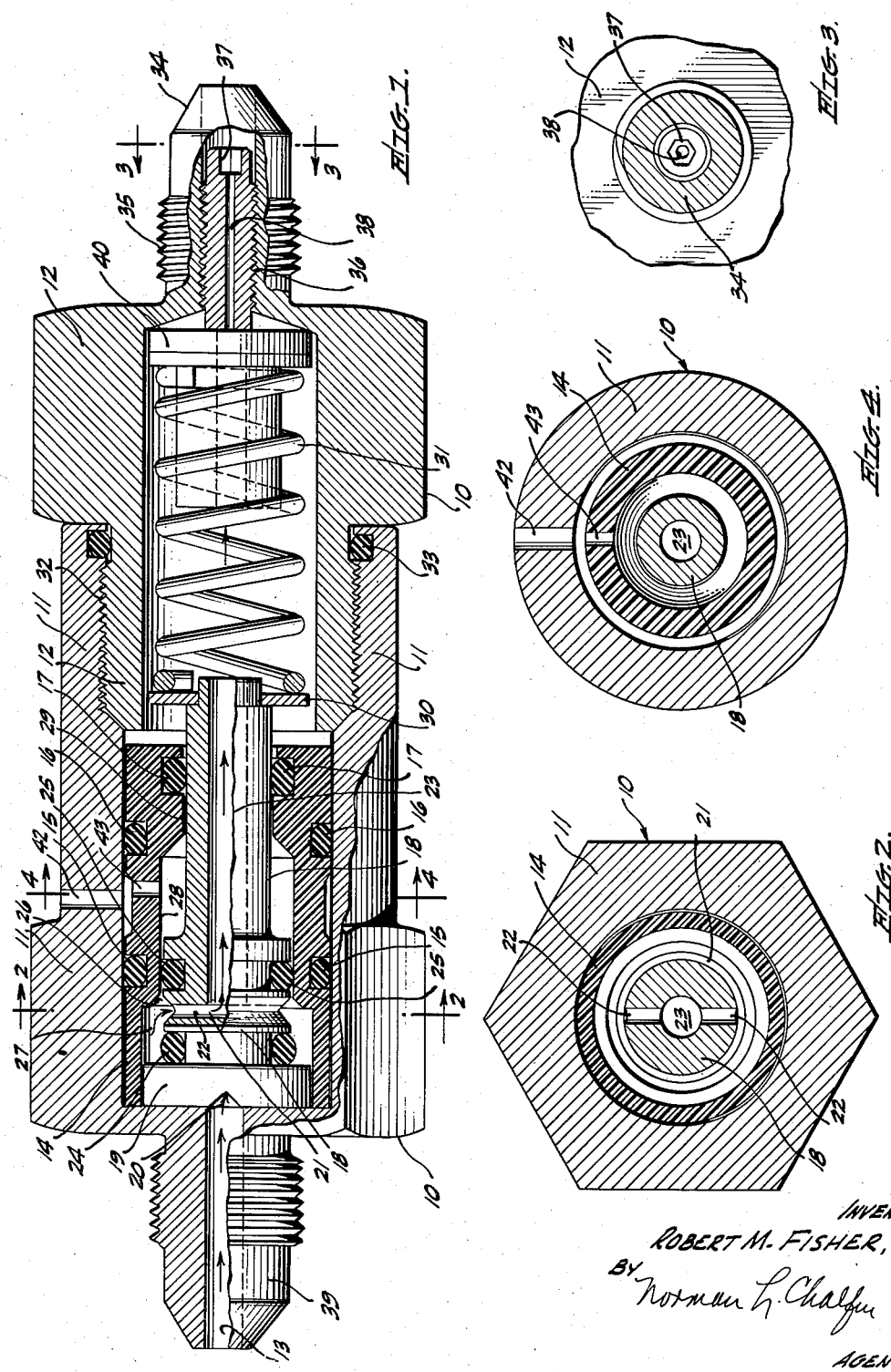

2,968,315
PREDETERMINED PRESSURE SHUT-OFF VALVE
Robert M. Fisher, 220 35th St., Manhattan Beach, Calif.
Filed Feb. 5, 1958, Ser. No. 713,471
3 Claims. (Cl. 137—517)

This invention relates to hydraulic or pneumatic valves and more particularly to a predetermined pressure shut-off valve for use in hydraulic or pneumatic lines to protect gauges or other pressure sensitive units in the lines from damage due to excess pressures.

When gauges or other pressure sensitive units are used in hydraulic or pneumatic lines for the indication of pressures or other similar parameters in the line, it is important to provide means for the protection of the gauges from overload when the pressure in the line exceeds the maximum operating limit of the gauge. In general, this has been accomplished by manual shut off means which necessitates constant monitoring of the line pressure. Other methods of control have involved the use of exhaust type devices which allow the excess pressure to bleed off to the outside of the system. Some of these latter devices are shut-off valves, but they are not axial in configuration or use.

The present invention contemplates an absolute and automatic safety shut-off device to protect gauges or other elements of a system from excess pressures. In accordance with the invention, an axial valve arrangement is provided which may be preset for a predetermined value of pressure in the system beyond which the gas or fluid flow is shut off. As the pressure returns below the predetermined value the valve again automatically opens so that the indicator may again indicate the values for which it is calibrated or the flow continued in the system.

A feature of the valve, according to this invention, is the in-line or axial arrangement of its parts in concentric configurations permitting direct insertion of the new valve into the line between the source and the receiver of the flow.

Accordingly, it is an object of this invention to provide a novel automatic overload protection valve for pressure gauges.

It is a further object of this invention to provide a novel automatic overload protection valve for pneumatic or hydraulic systems comprising concentric arrangement of a pressure sensitive resiliently mounted piston in line with the flow path.

It is another object of this invention to provide an improved automatic in-line pressure responsive valve for hydraulic or pneumatic systems in which an excess over predetermined pressures will cause the valve to shut off the flow there through, and reopen when the pressure falls below the predetermined value.

It is yet another object of this invention to provide a gauge saving valve device having automatic resilient means to prevent overload by shutting off the flow during the occurrence of excess pressures.

These and other objects of this invention and its novel features will be better understood from the following description considered in connection with the accompanying drawings in which an embodiment of the invention is illustrated by way of example, and the scope of the invention is pointed out in the appended claims.

Figure 1 is a longitudinal, partially cut away and partially cross-sectional diagram of an embodiment of the automatic predetermined pressure shut off valve of this invention;

Figure 2 is a cross section through 2—2 of Figure 1;
Figure 3 is a cross section through 3—3 of Figure 1; and Figure 4 is a cross section through 4—4 of Figure 1.

Referring now to Figure 1, an embodiment of the automatic predetermined pressure safety valve for gauges or other pressure responsive devices is illustrated in a partially cutaway and cross-sectional longitudinal view. The valve according to this invention, comprises a generally hollow valve body 10 having two in-line concentric portions 11 and 12. Body portion 11 is the inlet portion of the valve and body portion 12 is the outlet portion of the valve. Inlet portion 11 has at one end thereof an externally threaded inlet nozzle 39 with a concentric central inlet port 13 communicating through the length of nozzle 39. Nozzle portion 39 of the body is smaller in diameter than the body 10 and normally has a diameter such that it may be fitted with standard pneumatic and hydraulic fittings. Alternative arrangements for different fittings may be necessary and are possible for interconnecting the inlet nozzle 39 with a system and these will occur to those skilled in the art.

Valve body 10 is generally hollow to receive the various parts of the valve in accordance with this invention. One of these internal parts is a piston sleeve 14 having several concentric grooves of generally rectangular trough configuration to hold the O-rings 15 and 16 on the outer diameter of the sleeve 14, and a similar concentric trough on the inner diameter of sleeve 14 to support the O-ring 17. The O-rings provide seals between adjunct surfaces. Concentrically, within sleeve 14, a piston 18 is inserted. Piston 18 has a head portion 19, larger in diameter than the remainder of the piston, in which there is a groove 20 cut transversely across the center of head 19. Head 19 in its normal position within sleeve 14 butts against the inner wall of the body in contact with the inlet port 13 through nozzle 39. Groove 20 is over the opening of inlet port 13 into the body hollow. The diameter of head 19 is smaller than the counterbore 27 of sleeve 14 in which it is positioned. Piston 18 has a rectangular groove area for an O-ring 24 on the opposite side of head 19 from the groove 20. Next along the piston 18 a groove or undercut, 21 is provided. In line with groove 21, but normal to the direction of groove 20 in head 19 a transverse passage 22 is cut through piston 18. This passage 22 is more clearly illustrated in section 2—2 of Figure 1, shown in Figure 2. The reference characters of Figure 2 correspond to the same items of Figure 1. From a point corresponding to the position of groove 21 piston 18 has a longitudinal axial passage 23 bored through to the other end of the piston opposite to head 19. The outer diameter of piston 18, beyond head 19, and groove 21 has a rectangular trough to accommodate an O-ring 25.

Counterbore 27 of sleeve 14 may be seen to be turned at the inlet end of sleeve 14 to accommodate movement of head 19 of piston 18. At the termination of counterbore 27 away from the inlet end of sleeve 14, a chamfer 26 is provided concentric with counterbore 27 and terminating in a counterbore 28 of smaller diameter than counterbore 27. Another counterbore surface 29 leads from counterbore 28. This surface is smaller in diameter than counterbore 28. The area 28 to 29 is called a differential diametral area. Surface 29 has a rectangular groove to accommodate O-ring 17, previously mentioned.

Piston 18 is movably supported in sleeve 14 by counterbores 28 and 29 above enumerated. O-rings 25 and 17 act as atmospheric seals between piston 18 and the inner surfaces of sleeve 14. O-rings 15 and 16 act as atmospheric seals between the outer surfaces of sleeve 14 and the inner surfaces of inlet body portion 11 of body 10.

A communicating passage is thus formed from inlet port 13 through the longitudinal axial passage 23 of piston 18 by the following path: from inlet 13 fluid or gas may flow through groove 20 in head 19 of piston 18 into counterbore 27 of sleeve 14. Then the flow is through opening 22 in the groove portion 21 of piston 18 into longitudinal axial passage 23. At the terminal end of piston 18 a washer 30 is provided against which one end of a compression spring 31 is seated.

The second or outlet portion 12 of valve body 10 is threaded into the first or inlet portion 11 on the threads 32. A seal is provided in the form of the O-ring 33 and its undercut. In the outlet end 12 of valve body 10 an outlet nozzle 34 is provided. Nozzle 34 has outer threads 35 and inner threads 36. In the central inner threaded area 36 an adjustment screw 37 is provided. Adjustment screw 37 has a hex socket head at the outlet end and a central hole 38 through its length. At the inlet end of adjustment screw 37 a washer 40 is provided. One surface of washer 40 butts against the other end of spring 31. Adjustment screw 37 butts against the other surface of washer 40. Thus, normally there is a continuous communicating passage from hole 23 of piston 18 through hole 38 through screw 37 to the outside of the system through nozzle 34.

Atmospheric bleed holes are provided in body portion 11 at 42 and in sleeve 14 at 43. These may more fully be seen in the cross section 4—4 of Figure 1, shown in Figure 4.

In Figure 3 a cross-section of 3—3 of Figure 1 is shown. The details of the nozzle 34 area are included in Figure 3. The reference characters of Figure 4 and Figure 3 bear the same numbers as the corresponding parts of Figure 1.

The operation of the predetermined shut-off valve of this invention may be followed by reference to the embodiment of the valve illustrated in Figure 1. Figure 1 is drawn in the "normal" or "open" condition of the valve in which flow through the valve is continuous.

Ordinary use of the valve of this invention involves the insertion of the valve into a line where there is flow of fluid or gas. The valve is inserted in the line in an "in-line" manner, that is there is a continuous axial line with no bends or right angle operated elements involved when this invention is used.

When so inserted fluid or gas flow is through the inlet 13 of nozzle 39 into groove 20 in head 19 of piston 18, and into counterbore 27. Then the flow is into transverse passage 22 and longitudinal passage 23 of piston 18 and through the area of body portion 12 containing spring 31 into hole 38 of screw 37 and on out into the system through nozzle 34. So long as the pressure of head 19 on the differential diametral area 28 and 29 is insufficient to overcome the resilient urge of compression spring 31 the flow continues over the communicating path described above from inlet nozzle 39 to outlet nozzle 34. As the pressure increases on this differential diametral area, piston 18 is pushed against spring 31 and head 19 with its O-ring 24 moves in counterbore 27 towards chamfer area 26, of sleeve 14. At some pressure value determined by the resilient urge of spring 31 O-ring 24 is closed against chamfer 26 to form a tight seal against which no fluid or gas may flow. Thus a leak proof seal against flow between counterbore area 27 and transverse passage 22 and into longitudinal passage 23. Thus no communication to nozzle 34 is provided for any fluid or gas and the valve is shut off. As long as the pressure is at the shutoff level, or greater, the O-ring 24 is pressed against chamfer 26. When the pressure is reduced at inlet port 39, head 19 moves back towards the inner wall of nozzle 39 to open the seal between O-ring 24 and chamfer 26, and normal flow resumes out of counterbore 27 and into passage 22 and then into passage 23, and on into passage 38 and out of nozzle 34.

By means of adjustment screw 37 the pressure of spring 31 against washer 30 and accordingly against piston 18 can be regulated. Thus the pressure is increased or decreased to change the pressure value at which shut-off will occur.

There has been described above, an automatic in-line, predetermined-pressure, shut-off valve for insertion in fluid flow or gas flow systems which has means 31, 30, 37, and 40 for freely adjusting the pressure level at which shut-off will occur, and which makes novel use of the diametral difference in valve piston sleeve areas 28 and 29 to create a differential pressure element acting against the pressure level adjustment.

What is claimed as new is:

1. An automatic in-line, predetermined-pressure shut-off valve comprising the combination of a generally hollow valve body, having an inlet portion and an outlet portion in axial alinement, said inlet portion having a coaxial sleeve therein, said sleeve having an internal diameter nearest the inlet of one dimension, and an internal diameter farthest from the inlet of another dimension smaller than said one dimension; said inlet and outlet portions each, respectively, having an externally threaded nozzle, respectively, for coupling in a flow line between a source and a receiver of fluid under pressure; a generally cylindrical axially movable closure piston assembly having a diameter at its inlet end corresponding with said one diameter of said sleeve, and a diameter at its outlet end corresponding with said other diameter of said sleeve, said piston being concentrically disposed in said sleeve and adapted to have a first position within said sleeve to permit the flow of fluid therethrough, and a second position in axial relation to said first position, wherein the flow of fluid is cut off; a compression spring disposed within said outlet portion of said valve body, abutting and in axial engagement with said piston to apply a resilient urge against said piston to said first position thereof; and an adjustment screw abutting said compression spring for adjusting the resilient urge of said spring against said piston to a predetermined pressure, whereby when the pressure of fluid applied to said inlet portion equals and exceeds said predetermined pressure said piston is moved to said second position to cut off said fluid flow.

2. An automatic, in-line, predetermined-pressure, shut-off valve comprising: a valve-body having an inlet port and an outlet port axially positioned at either end of said housing; a piston sleeve concentrically positioned within said valve body and abutting said inlet port, said sleeve having differential diametral areas on the inside surfaces thereof, a piston having differential external diameters corresponding with and engageable with said differential diametral areas of said sleeve movably and concentrically positioned within said sleeve; a resilient means abutting one end of said piston and adapted to be responsive to predetermined pressures of fluids applied to said inlet port against which said piston may be moved in said sleeve, said piston having communicating passages normally permitting flow therethrough to said outlet port and sealing means normally open, said sealing means being compressible between portions of said differential diametral areas of said sleeve and said piston to shut off the flow when the pressure of the fluids applied thereto exceed said predetermined pressures.

3. An automatic, in-line predetermined-pressure shut-off valve comprising the combination of: a hollow valve body having an inlet portion and an outlet portion in axial alinement and having first and second internal diametral areas therein, each said area, respectively, being different in cross-sectional area from the other; a movable, generally cylindrical closure piston having first and second external diameters corresponding with and engageable with said first and second internal diametral areas of said valve body, and adapted to be positioned in said body concentrically therewith, and so positioned as to have a normally open position, and a closed-upon-pressure position in said inlet portion; and resilient and adjustable counterpressure means disposed in said outlet portion in axial alinement with said piston and abutting said piston to urge said piston to said normally open position until pressure applied to the valve and impressed on said inlet portion reaches a value predetermined by the adjustment of said counterpressure means whereupon due to said different diametral areas in said body and the diametral cross-section of said piston, said piston is moved to said closed-upon-pressure position where it remains until the pressure on the inlet portion of said valve again falls below the predetermined value.

References Cited in the file of this patent

UNITED STATES PATENTS

| | | |
|---|---|---|
| 891,808 | Adams | June 30, 1908 |
| 1,355,663 | Greb | Oct. 12, 1920 |
| 1,418,096 | Royer | May 30, 1922 |
| 2,136,898 | Thomas | Nov. 15, 1938 |
| 2,591,514 | Courtot | Apr. 1, 1952 |
| 2,750,956 | Stevenson | June 19, 1956 |
| 2,781,775 | Merrill | Feb. 19, 1957 |